Oct. 1, 1957 — W. G. MARTIN — 2,808,097
APPARATUS FOR FABRICATING A FIBER REINFORCED STORAGE STRUCTURE
Filed July 12, 1954 — 4 Sheets-Sheet 1

INVENTOR.
WESLEY G. MARTIN
BY
*Andrus & Scales*
Attorneys

INVENTOR.
WESLEY G. MARTIN

Oct. 1, 1957 W. G. MARTIN 2,808,097
APPARATUS FOR FABRICATING A FIBER REINFORCED
STORAGE STRUCTURE
Filed July 12, 1954 4 Sheets-Sheet 3

INVENTOR.
WESLEY G. MARTIN
BY *Andrus & Scales*
Attorneys

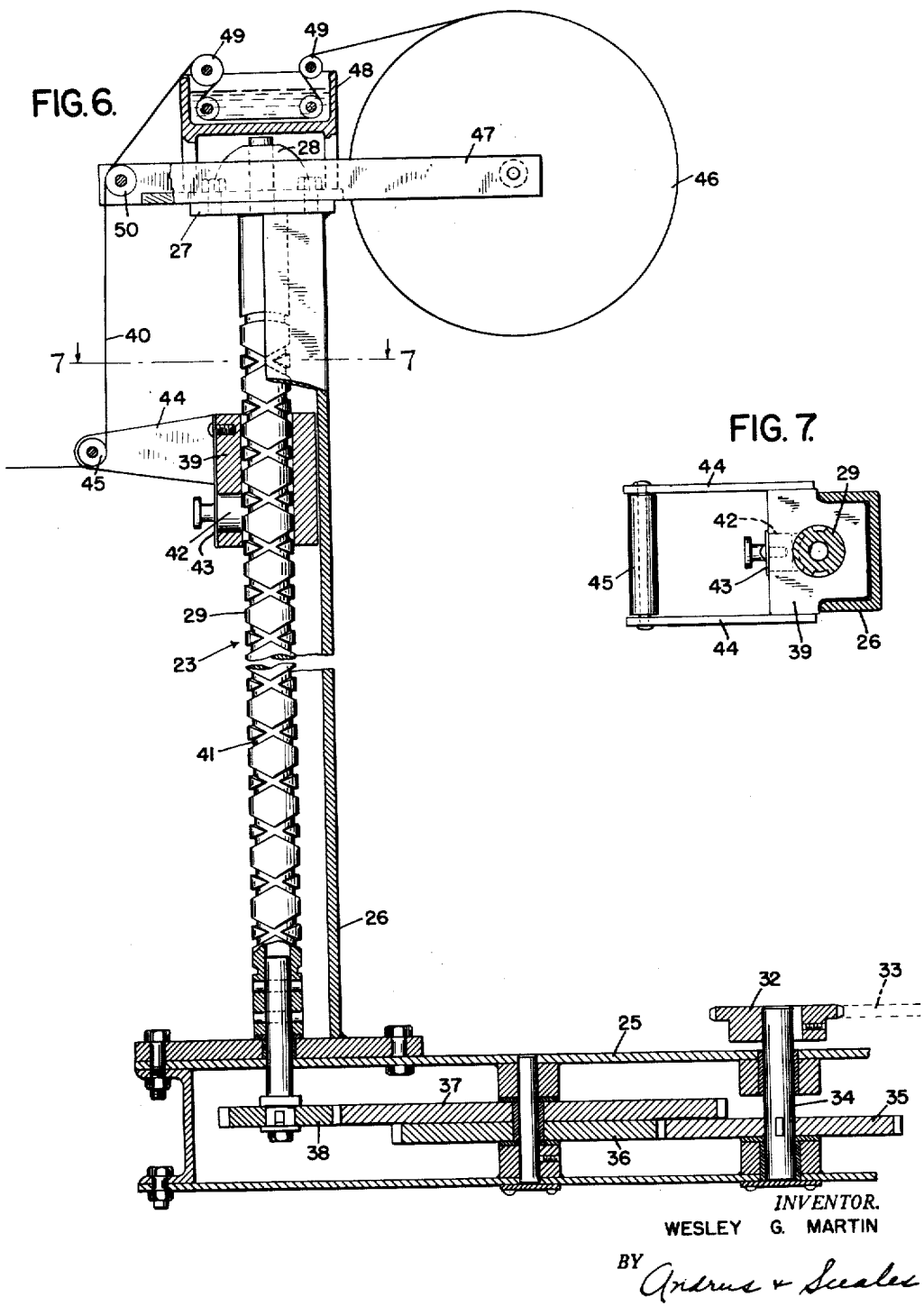

United States Patent Office 2,808,097
Patented Oct. 1, 1957

2,808,097
APPARATUS FOR FABRICATING A FIBER REINFORCED STORAGE STRUCTURE

Wesley G. Martin, Milwaukee, Wis., assignor to A. O. Smith Corporation, Milwaukee, Wis., a corporation of New York Application July 12, 1954, Serial No. 442,801

11 Claims. (Cl. 154—1.7)

This invention relates to a method and apparatus for fabricating a storage structure, and more particularly to a storage structure formed of fiber glass reinforced plastic.

Large storage vessels, such as silos and oil tanks, cannot ordinarily be fabricated in the factory due to the size of the vessel and the difficulty of transporting the same to the site. When erecting a storage vessel in the field it is not only necessary to transport to the site the materials of which the vessel is to be made, but the supporting structure, the erecting equipment and the welding equipment or the like must also be brought to the site. Thus, a good share of the cost of erecting a large storage vessel is in the labor of material handling, the assembly and disassembly of the supporting structure and the manual attachment of the several segments or portions to form the completed vessel.

The present invention is directed to a method of fabricating a storage structure from fiber glass reinforced plastic which substantially reduces material handling, minimizes the labor required in assembling the supporting structure and virtually eliminates the time and labor of attaching segments together to form the vessel.

The apparatus of the present invention comprises, generally, a base ring mounted on a suitable foundation which rotatably supports a sectionalized cylindrical mandrel. The mandrel is composed of a plurality of vertically superimposed cylindrical rings which are removably secured together.

As the mandrel is rotated on the base ring, a fibrous glass roving is wound about the mandrel in a generally helical pattern to form a cylindrical section. The glass roving is either impregnated with an unpolymerized resin before winding or the resin may be subsequently applied to the wound section.

After winding of the section and polymerization of the resin, the mandrel and the wound section are elevated by a plurality of screw jacks. The uppermost ring of the mandrel is removed and reattached to the lowermost ring of the mandrel. The reattached ring is then wound with the glass roving with the windings overlapping the lower edge portion of the previously wound section to form an integral structure.

This procedure of winding and elevating is repeated until the structure has achieved the desired height. The completed structure is then backed down by the screw jacks onto the base ring and secured thereto.

By the present method of construction, a structure of any desired height can be formed with a minimum of equipment and material handling. As the structure is wound of glass roving, there is but a small amount of labor required in the process. After assembly of the winding and elevating apparatus, the winding proceeds automatically and substantially eliminates material handling and minimizes the labor required for assemblying and erecting the structure.

The drawings furnished herewith illustrate the best mode presently contemplated of carrying out the invention as set forth hereinafter.

In the drawings:

Fig. 6 is a vertical section of the winding mechanism and its gear box;

Fig. 7 is a horizontal section taken along line 7—7 of Fig. 6;

Figure 1:
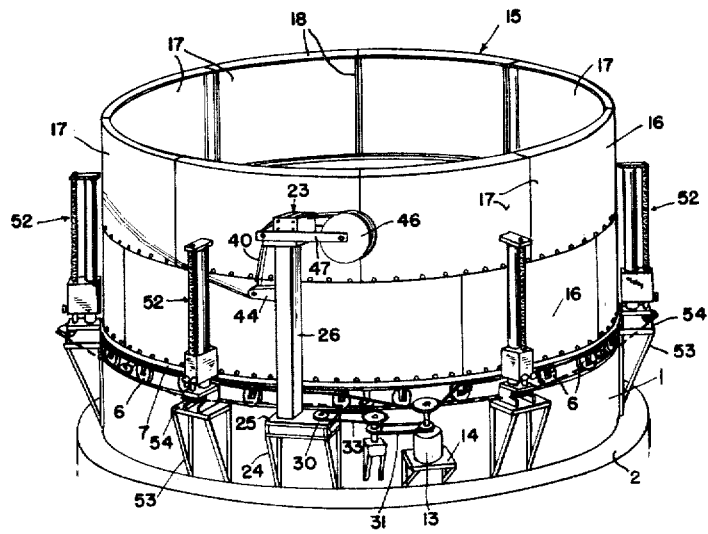
Figure 1 is a perspective view of the apparatus of the present invention as the mandrel is initially wound with the roving.
Figure 2:
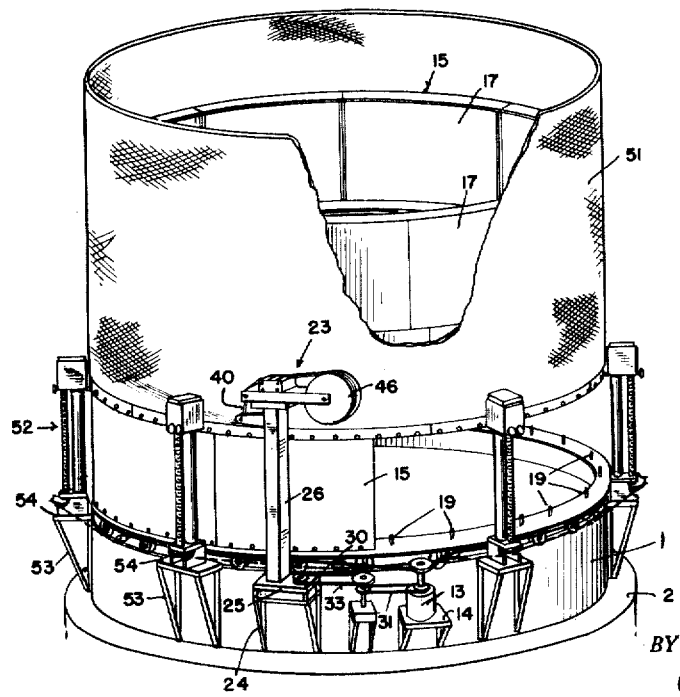
Fig. 2 is a perspective view partially broken away in section showing the partially completed structure.

Referring to the drawings there is shown an apparatus for fabricating and erecting a storage structure, such as a silo or oil tank, which comprises a generally cylindrical base ring 1 which is supported by and secured to a foundation 2.

The base ring 1 may consist of a series of generally arcuate metal panels which are bolted together at their edges to form the ring. In the completed structure the base ring 1 may be partially or fully covered with back fill.

An angle ring 3 is secured to the outer surface of base ring 1 adjacent the upper edge thereof. A cap 4 having a generally T-shape is disposed on the upper edge of base ring 1 and is bolted to angle 3 to provide a support for annular rail 5 which is welded thereto.

A series of circularly spaced rollers 6 which are suspended from a base plate 7 are adapted to ride on rail 5. The rollers 6 are each rotatably secured within channel brackets 8 which are attached to the undersurface of plate 7.

The base plate 7 is rotated about its central axis by a driven chain 9. Chain 9 is provided with a series of spaced projections 10 which are adapted to engage a series of lugs 11 welded edgewise to brackets 8 and plate 7. Lugs 11 extend laterally from the corresponding brackets. The chain 9 is disposed within notches 12 formed in the lugs 11 and the projections 10 bear against the side surfaces of the lugs to rotate the base plate 7 in accordance with movement of chain 9.

The chain 9 is driven by a motor 13 which is supported on a platform 14 attached to the outer surface of base ring 1. Suitable chain tightening sprockets may be employed to keep the required tension on chain 9.

A generally cylindrical mandrel 15 is supported on base plate 7 and rotates therewith. Mandrel 15 is composed of a series of vertically superimposed cylindrical rings 16. Rings 16 are each formed of a series of generally arcuate panels 17 having inwardly extending flanges 18 on the peripheral edges thereof. The panels are assembled to form the cylindrical rings 16 by bolting or otherwise securing the matching vertical flanges 18 of adjacent panels together and the rings 16 are assembled to form the mandrel by attaching the matching horizontal flanges 18 of adjacent rings together.

The mandrel 15 is removably secured to the base plate 7 by means of a plurality of upstanding pins 19 which are secured to the upper surface of plate 7 and are received within suitable openings formed in the lower horizontal flange 18 of the panels 17. By virtue of the engagement of pins 19 with the flanges 18 of the panels, rotary motion of the base plate 7 causes a corresponding rotary motion of the mandrel 15.

Figure 8:
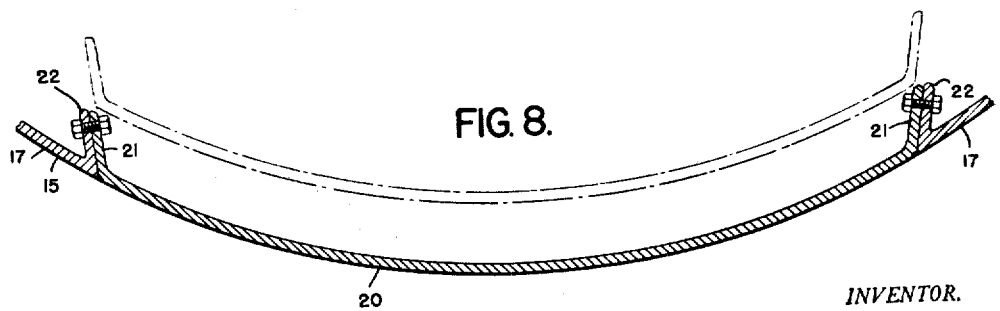
Fig. 8 is a fragmentary horizontal section taken through the mandrel and showing the initially removable panel of the mandrel.

To facilitate the assembly and removal of the panels 17 inwardly of the mandrel, one panel 20 of each ring 16, as shown in Fig. 8, is formed with inwardly diverging side flanges 21. The flanges 22 of the adjacent panels in the section are provided with complementary inwardly converging flanges. This construction permits each ring 16 to be assembled and disassembled from the interior of the mandrel.

As the mandrel 15 is rotated on base ring 1, it is wound in a generally helical pattern with strands of a fibrous material, such as glass roving or yarn by a winding head assembly 23.

The winding head assembly 23 comprises a bracket 24 which is secured to the outer surface of base ring 1 and supports a gear housing 25.

An upstanding channel support 26 is secured to the upper wall of gear casing 25 and the upper end of channel 26 supports a plate 27 which carries a bearing 28. A vertically disposed jack screw 29 is partially housed within channel 26. The upper end of screw 29 extends through a suitable opening in plate 27 and is journaled within bearing 28 and the lower end of screw 29 is journaled within the top plate of gear housing 25.

The screw 29 is rotated by a drive system which includes a speed increasing mechanism 30 which is connected to motor 13 through sprocket drive 31.

The speed increasing mechanism 30 in turn is connected to a drive sprocket 32 by chain 33. The sprocket 32 is keyed to a shaft 34 which is rotatably secured to the upper and lower walls of gear housing 25. Rotation of shaft 34 is transmitted through gears 35, 36, 37 and 38 to the lower end of screw 29 which is disposed within gear housing 25.

A winding head 39 is adapted to travel vertically in a reciprocating manner on screw 29 as the screw is rotated and guides the glass roving 40 so that the roving will be laid on the mandrel in a generally helical pattern.

Screw 29 is provided with a double helical groove 41 which extends substantially the length of the screw and the head 39 is guided in movement on screw 29 by a pin 42 which extends through an opening in the wall of the head and engages groove 41. The pin 42 is biased inwardly into engagement with groove 41 by spring 43. As screw 29 rotates, pin 42 rides in groove 41 and causes head 39 to move vertically. When pin 42 reaches the end point of one helical groove, it passes into the reverse helical groove and proceeds in the opposite direction, thereby imparting a vertical reciprocating movement to head 39.

To guide the roving 40, a pair of brackets 44 are secured to head 39 and extend outwardly therefrom. Brackets 44 rotatably support a roller 45 over which the roving travels.

The roving 40 is contained on a reel 46 which is rotatably secured between a pair of arms 47 attached to plate 27.

Roving 40 is impregnated with a suitable thermosetting resin, such as an unpolymerized epoxy or polyester resin solution. The impregnation may either occur prior to winding the roving on the mandrel or the wound roving may be subsequently impregnated with the resin by spraying or dripping the resin on the wound structure. As shown in the drawings, the roving is coated with resin prior to winding. A trough 48 is disposed above plate 27 and secured thereto. The trough 48 contains the liquid unpolymerized resin and the roving passing from reel 46 is directed through the resin in trough 46 by a train of rollers which are rotatably secured to trough 48 and are indicated generally by 49.

The roving is guided from roller train 49 to roller 45 on head 39 by a roller 50 which is rotatably mounted between the outer ends of arms 47.

The free end of the roving is initially secured to the mandrel 15 by any desired means, such as an adhesive or clamps. Rotation of the mandrel 15, draws the roving from reel 46, through trough 48 and over roller 45 to wind the same about the mandrel. As the screw 29 and mandrel 15 are both driven by motor 13, rotation of mandrel 15 is accompanied by vertical movement of head 39 so that the roving is wound on the mandrel in a helical pattern to form a cylindrical section 51. The pitch of the helical pattern and the spacing or overlap between each convolution are determined by the relative speeds of the head 39 and the mandrel 15.

After the mandrel 15 has been substantially wound with the roving 40 and the resin has polymerized to form a resin-bonded cylindrical section 51, the mandrel 15 and the section 51 are elevated by a plurality of jack assemblies 52 which are disposed in a circularly spaced relation about the mandrel.

Figure 4:
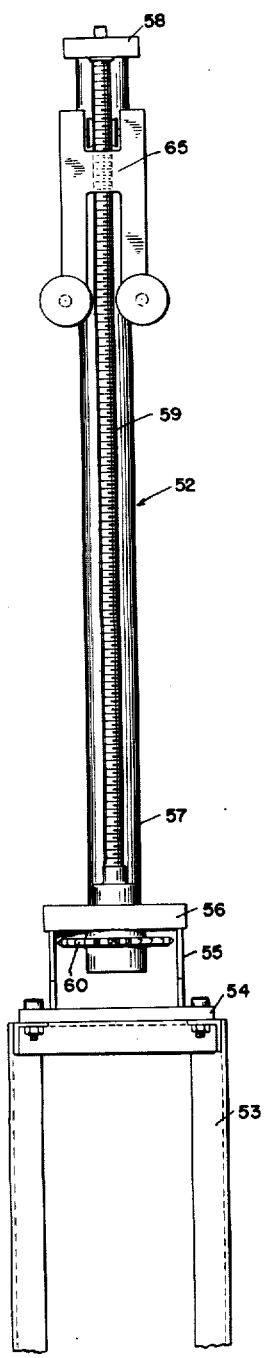
Fig. 4 is a front elevation of the lifting jack.
Figure 5:
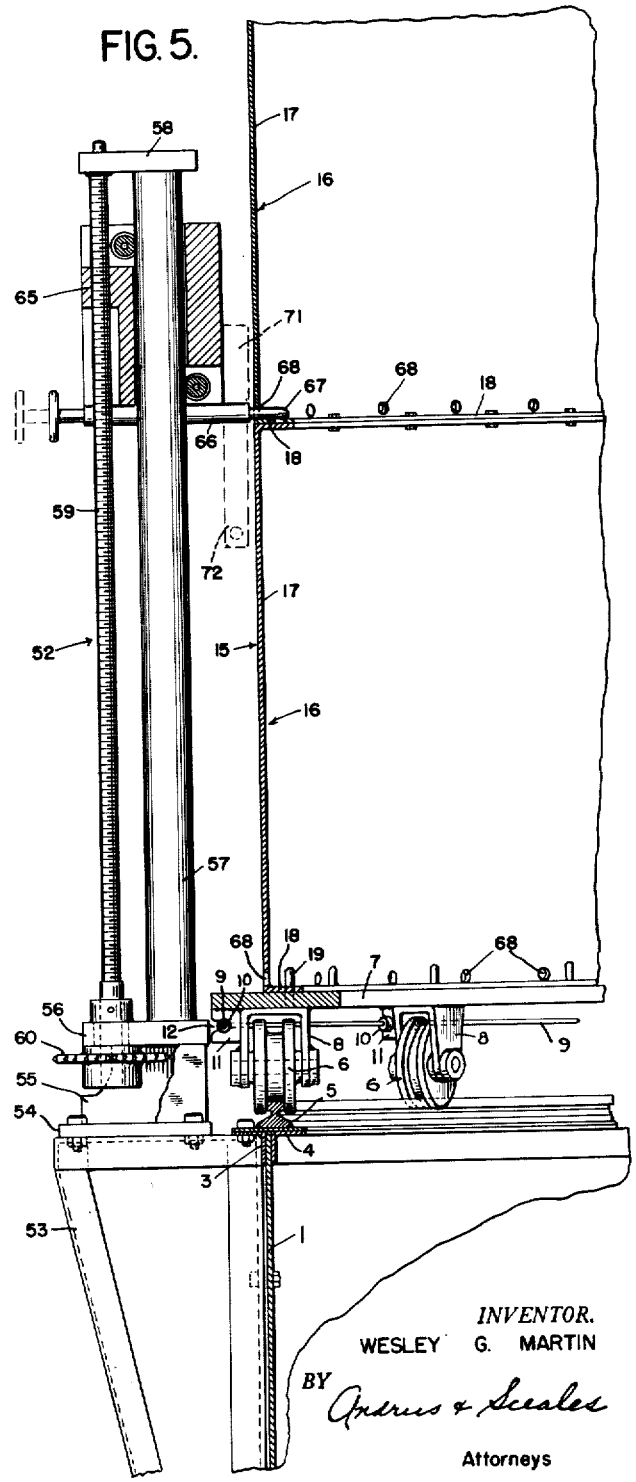
Fig. 5 is a fragmentary vertical section of the structure taken at the position of a lifting jack.

Each jack assembly 52, as best shown in Figs. 4 and 5, consists of a supporting frame 53 which is removably secured to the outer surface of base ring 1 and supports a platform 54.

A channel member 55 is secured edgewise to the upper surface of platform 54 and supports a base plate 56. A vertical support column 57 is secured to plate 56 and the upper end of column 57 is capped by plate 58 to provide a rigid supporting structure for a screw 59 which is rotatably secured between plates 56 and 58.

To rotate screw 59, a drive sprocket 60 is keyed to the lower end of the screw and is disposed between plate 56 and platform 54.

An endless chain 61 engages the sprockets 60 of each jack assembly and is driven by a motor 62. The motor 62 is supported on a platform 63 which is suitably secured to the outer surface of base ring 1.

To maintain the proper tension on chain 61, an idler sprocket 64 is disposed between adjacent drive sprockets 60.

As all of the jack assemblies are driven by chain 61, movement of chain 61 will result in a simultaneous rotation of each of the screws 59.

A nut 65 is threadedly engaged with each screw 59 and moves vertically in accordance with rotation of the screw. A sleeve 66 is secured to the bottom of the nut and extends radially of the mandrel. The sleeve 66 slidably receives a plunger 67, and the inner end of each of the plungers 67 is adapted to be inserted within an opening 68 formed in the lower portion of each cylindrical ring 16 of the mandrel.

To elevate the mandrel, the nuts 65 are run down to a position where plungers 67 are in alignment with openings 68 in the lowermost mandrel ring 16. The plungers are inserted into the corresponding openings 68 and the nuts are run up thereby elevating the mandrel and the completed cylindrical section 51 of the structure.

The mandrel is elevated to a position where the panels 17 of a cylindrical mandrel ring 16 can be attached to the lower edge of the original lowermost ring. The mandrel is then lowered by running nuts 65 down on screws 59 until the newly attached ring 16 rests on plate 7 and pins 19 are engaged with the openings in the lower flange of the ring.

After removal of plungers 67 from openings 68, the newly attached section of the mandrel is in readiness to be wound with the roving 40.

The length of the helical groove 41 on screw 29 is slightly greater than the height of each of the cylindrical rings 16, so that at a given vertical position of mandrel 15 the winding pattern will slightly overlap the lower edge portion of the previously wound cylindrical section 51.

To assemble the present apparatus the base ring 1 is initially secured to foundation 2 and the angle ring 3, annular cap 4 and rail 5 are secured to the upper edge of ring 1 to form the track for rollers 6. The rollers and the attached base plate 7 are then mounted on the rail 5.

The winding head assembly 23, jack assemblies 52 and their respective drive systems are then secured in position on base ring 1.

The next operation is the assembly of the mandrel 15 on the base plate 7. The panels 17 of the lowermost ring 16 of mandrel 15 are secured together to form the ring and engaged with pins 19 of base plate 7 to position the cylindrical ring 16 on the base ring 1. The panels of a second ring 16 are then attached to the upper edge of the initially assembled ring 16 by securing the matching horizontal flanges of the two rings together.

The free end of the glass roving 40 is threaded over the guiding rollers and is attached to the assembled portion of the mandrel by an adhesive.

Motor 13 is then started causing a simultaneous rotation of mandrel 15 and a vertical reciprocating movement of head 39. This action draws the roving 40 from the reel 46, through the resin-impregnating trough 48, and winds the roving about the mandrel in a generally helical pattern.

After the mandrel 15 has been wound with the desired number of helical layers of roving, determined by the stress requirements of the storage structure, to form the section 51, the motor 13 is stopped to terminate the winding operation.

The mandrel 15 and the section 51 are then elevated by engaging plungers 67 of nuts 65 within the openings 68 in the lower edge portion of the lowermost ring 16. By operation of motor 62, nuts 65 of the jack assemblies 52 are threaded up on screw jacks 59 to elevate the mandrel 15 and section 51.

While the mandrel is supported by the jack assemblies, a third ring 16 is attached to the lower edge portion of the second ring to form a mandrel of a three-tier height.

After the attachment of the third ring 16, the mandrel is backed down by operation of the jack assemblies into engagement with base plate 7.

During elevation of the mandrel 15, the glass roving 40 is drawn from the reel and follows the upward movement of the mandrel. Alternately, the roving may be cut and then reattached to the mandrel when the second section of the structure is to be wound.

With the mandrel again secured to base plate 7, the motor 13 is actuated producing rotation of the mandrel and reciprocation of the winding head 39 to wind the newly attached third ring with the roving 40. The winding pattern is such that the roving overlaps the lower edge portion of the previously wound section 51 to form an integral structure.

After winding the newly attached third ring 16 with the roving, the mandrel and completed sections 51 are again elevated. To reduce the number of mandrel rings 16 required, the uppermost ring is disassembled and reattached to the lower edge portion of the lowermost ring.

The mandrel is then backed down onto base plate 7 and the newly attached ring 16 is wound. This procedure of winding, elevating, and reattaching the uppermost mandrel ring at the bottom of the mandrel is repeated until a cylindrical structure of the desired height is obtained.

Figure 9:
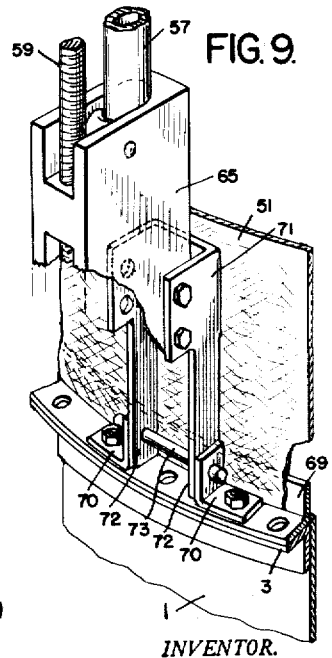
Fig. 9 is an enlarged fragmentary perspective view showing the lower end of the completed structure lowered for assembly to the base ring.
Figure 3:
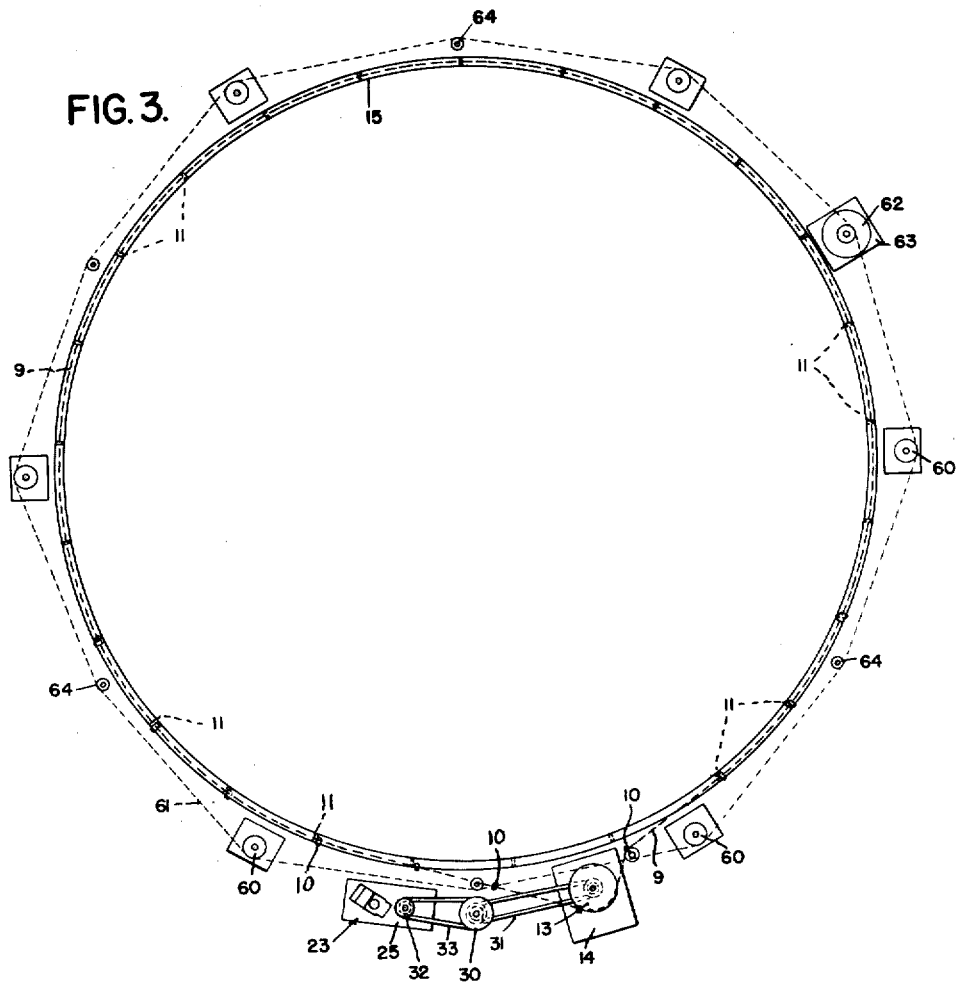
Fig. 3 is a diagrammatic plan view of the driving mechanism of the apparatus.

When the structure 51 has been wound to the desired height, an angle ring 69 is disposed around the lower edge portion of the wound structure and additional windings are made to cover the upstanding flange of the angle and, on curing of the resin, the angle is integrally attached to the cylindrical structure as shown in Fig. 9. A plurality of pairs of angle brackets 70 are removably secured in spaced relation on the outwardly extending flange of angle ring 69.

After attachment of the angle ring 69 and brackets 70, the plungers 67 are disengaged from the openings 68 in mandrel ring 16 and nuts 65 are run upwardly on screws 59. An extension 71 is then removably secured to each of the nuts 65. The extensions 71 extend downwardly from the corresponding nuts 65 and are each provided with a pair of spaced arms 72.

The nuts 65 are then run down on screws 59 until the arms 72 are in contiguous relation with the upstanding flanges of the angle brackets 70. The arms 72 are then attached to the corresponding brackets 70 by bolts 73.

The nuts 65 are then run upwardly to elevate the structure 51 a sufficient amount to disengage the upstanding pins 19 from the openings in the flanges 18 of mandrel ring 16. The base plate 7 and rollers 6, cap 4 and rail 5 are disengaged from base ring 1, the mandrel rings 16 are disassembled and the structure 51 is then lowered until the angle ring 69 engages the complementary angle ring 3 on base 1. This position is shown in Fig. 9.

The fabrication is completed by removing angle brackets 70 from angle ring 69 and securing the matching angle rings 3 and 69 together by bolts or the like.

The use of nut extensions 71 permits the structure to be lowered down to the base ring 1, below the lower extremities of screws 59, and thus enables shorter length screws to be employed in the fabrication.

The structure may be enclosed at the top by a suitable roof, if desired.

It is contemplated that reinforcing ribs or stiffeners, fabricated of either plastic or metal, may be secured to the surfaces of the structure or may be embedded within the windings to increase the strength and rigidity thereof. The reinforcement depends on the nature of the contained material, the height and diameter of the structure and the thickness and specific composition of the structure.

While the above description is directed to the use of fibrous glass strands or roving as the winding material, it is contemplated that any other strand material having the necessary strength and physical properties for the particular structure to be fabricated, may be employed as the winding material. For example: asbestos, cotton, sisal, paper or synthetic fibers, such as regenerated cellulose, polyamide, acrylic, polyester or protein, may be used as the winding material.

The resin used to coat the winding material may take the form of a thermosetting resin such as a polyester resin in which at least one of the reactants contains an unsaturated double bond in an aliphatic group. For example: the unsaturated bond may be in the polybasic acid component such as when maleic acid or anhydride is reacted with a polyhydric alcohol such as glycerol, ethylene glycol, diethylene glycol, propylene glycol, sorbitol, mannitol, pentaerythritol, polyethylene glycol and the like. In addition thermosetting resins of the diallylphthalate, epoxide, furane and vinyl types may also be employed as the resin coating for the fibrous material.

As the mandrel is elevated and the rings 16 are successively disengaged at the top of the mandrel and reattached at the bottom, the completed fiber glass sections 51 are unsupported. As the sections 51 are unsupported and the newly completed sections must bear the weight of the preceding sections, the resinous material employed to impregnate the roving 40 must be completely cured or set before the uppermost mandrel ring is removed. Thus the speed of the present process is determined to an extent by the curing time of the resin.

If the resin employed to coat the fiber glass requires heat to cure or if heating is deemed necessary to accelerate the curing, suitable heating means can be applied to the outer surface of the sections, or heat can be supplied to the mandrel, or both means may be utilized.

With use of the present invention a storage structure of any desired height can be quickly and conveniently fabricated in the field or in the plant. As the entire structure can be made with the use of several mandrel rings, the usual cost of material handling and assembly of superstructure is substantially reduced. After assembly of the mandrel, winding head and jack assemblies, the vessel can be wound with a minimum of labor.

Various modes of carrying out the invention are contemplated as within the scope of the following claims particularly pointing out and distinctly claiming the subject matter which is regarded as the invention.

I claim:

1. An apparatus for fabricating a storage structure comprising, a cylindrical mandrel formed of a series of vertically disposed cylindrical tiers, drive means for rotating said mandrel about the central axis thereof, a winding head disposed outwardly of the mandrel for supporting a fibrous strand, means for reciprocating said winding head means between fixed vertical limits and for winding the fibrous strand on the outer surface of the mandrel in a generally helical pattern, said winding head disposed with relation to said mandrel to locate said fixed limits from a position at the lower edge portion of one tier to a position at the lower edge portion of the next succeeding upper tier and the distance between said fixed limits being slightly greater than the height of said tiers, means for impregnating said strand with a resin material to form a resin bonded cylindrical section, and means for elevating said mandrel and said cylindrical section a distance approximately equal to the height of a tier to position a second lower portion of said mandrel between said fixed limits in location to be wound with said strand.

2. An apparatus for fabricating a generally cylindrical storage structure from a fibrous material, comprising a base, an annular member rotatably disposed on said base, means for rotating said annular member on said base, a sectionalized mandrel formed of a plurality of vertically superimposed cylindrical segments and removably secured in axial alignment on the annular member, said mandrel being adapted to rotate in accordance with rotation of said annular member, a winding head disposed outwardly of the mandrel to support a fibrous roving and lay the roving on the mandrel as the mandrel rotates, means for reciprocating the winding head between fixed vertical limits to lay said roving on the mandrel in a generally helical pattern, means for coating the roving with a liquid unpolymerized resin to form a resin-bonded cylindrical section of the structure, and means for elevating the mandrel and the cylindrical section from the annular member to permit attachment of an additional segmnet to the lower edge portion of said mandrel and for lowering the mandrel to dispose the newly attached segment on said annular member in alignment between the fixed limits of reciprocation of the head to permit a second cylindrical section to be wound in lapping bonded relation with the lower edge portion of the first section.

3. An apparatus for fabricating a substantially cylindrical storage structure from a fibrous roving, comprising a base, a substantially cylindrical mandrel rotatably disposed on the base, means for driving said mandrel in a rotary path on said base, means for winding a predetermined portion of the mandrel with fibrous roving and impregnating the same with a resinous material to form a resin-bonded cylindrical section of the storage structure, means engageable with the mandrel at circumferentially spaced locations thereon, and a series of vertical lifting members associated with said last named means and disposed to successively elevate said mandrel in increments of sufficient height to permit successive lower portions of the mandrel to be wound with said roving to form a series of vertically superimposed sections with each succeeding section overlapping and being bonded to the lower edge portion of the preceding section to form an integral cylindrical structure of desired height.

4. An apparatus for fabricating a generally cylindrical storage structure from a fibrous glass material, comprising a base, an annular member rotatably disposed on the base, a sectionalized mandrel formed of a plurality of vertically superimposed cylindrical rings and removably secured to said member and axially aligned therewith, means for rotating said member on said base to drive the mandrel in a rotary path, a winding head disposed outwardly of the mandrel to support a continuous strand of fibrous glass material, said material being attached to the mandrel and drawn from the head and wound on the mandrel by the rotation of said mandrel, means for impregnating the fibrous material with an unpolymerized resinous material, means for imparting a reciprocating vertical motion to said winding head as the mandrel is rotated to wind the strand in a generally helical pattern on said mandrel and form a resin-bonded cylindrical section, said pattern extending from a position slightly above the lower edge of one of said superimposed rings to a position slightly above the lower edge of the succeeding lower ring, a plurality of lifting members circumferentially disposed around the mandrel and adapted to engage the lower edge portion of the lowermost of said rings, and means for simultaneously elevating said lifting members to elevate the mandrel and said cylindrical section after polymerization of said resinous material to a height above said annular member in excess of the height of one of said rings to permit an additional ring to be attached to the lower edge portion of the mandrel with the newly attached ring being subsequently wound with said strand of fibrous material to form a second cylindrical section integrally bonded in a lapping relation with said first named cylindrical section.

5. An apparatus for fabricating a generally cylindrical storage structure from strands of fibrous material, comprising a base, a plurality of vertically superimposed cylindrical segments, each of said segments having an annular inwardly extending flange disposed adjacent the open ends thereof and having a series of circumferentially spaced openings adjacent the lower end thereof, means for removably securing the flanges of adjacent segments together to form a generally cylindrical mandrel, means for rotating the mandrel about the central axis thereof, winding means disposed outwardly of the mandrel and adapted to support a roving of fibrous material, said winding means being adapted to reciprocate vertically between fixed limits to wind said roving on the rotating mandrel in a helical pattern, said fixed limits extending from a position slightly above the openings in a segment to a position slightly above the openings in a second succeeding lower segment, means for coating the roving with a liquid thermosetting resin to form a resin-bonded cylindrical section after curing of said resin, a plurality of lifting members circumferentially spaced around the mandrel and disposed to be received within the openings in said second segment and to engage the mandrel, and means for simultaneously elevating said lifting members to raise the mandrel and resin-bonded section to position a third succeeding segment of the mandrel in alignment with the fixed limits of reciprocation of the winding means, said third segment being subsequently wound with said roving to form a second resin-bonded section disposed in lapping bonded relation to the lower edge portion of the first section.

6. A method of fabricating a cylindrical storage structure which comprises, winding a continuous strand of long filament glass fiber in a generally helical pattern around a portion of a rotating substantially cylindrical vertically disposed mandrel while coating the strands with an unpolymerized resin solution, polymerizing the resin coated strands to form a resin-bonded cylindrical section, moving the mandrel and the section vertically to dispose an adjacent succeeding portion of the mandrel in position to be wound with said strands, winding the succeeding portion of the mandrel and the lower edge portion of said section with said strands, and repeating the operations of coating said strands with said resin, polymerizing said resin and elevating said mandrel, said operations producing a series of vertically superimposed resin-bonded sections with the edge portion of each of said sections lapping and being bonded to the adjacent edge portion of the preceding section to produce an integral cylindrical structure.

7. A method of fabricating a substantially cylindrical storage vessel from strands of a fibrous material, comprising assembling a substantially cylindrical mandrel by connecting a plurality of sectionalized cylindrical sections together in a vertically superimposed relation, rotatably mounting said mandrel on a base, winding strands of a fibrous material around said mandrel in a generally helical pattern from a predetermined upper position to a position slightly above the lower edge of the lowermost section of said mandrel to provide a cylindrical part of the vessel, coating the material with a liquid uncured thermosetting resin, elevating said mandrel after curing said resin, removing the uppermost section from said mandrel, reattaching said uppermost section to the lower edge of the lowermost section, and the lower edge portion of said cylindrical part winding the reattached section with said fibrous material, and successively repeating the steps of elevating the mandrel, removing the uppermost section and reattaching said uppermost section to the lower edge of the lowermost section until the vessel has been fabricated to the desired height.

8. A method of fabricating a cylindrical storage structure which comprises, winding a continuous strand of long filament glass fiber between fixed vertical limits in a generally helical pattern around a portion of a rotating substantially cylindrical vertically disposed mandrel formed of a series of vertically superimposed cylindrical rings while coating the strands with an unpolymerized resin solution, curing the resin to provide a cylindrical section of said storage structure, elevating the mandrel and the section above said fixed vertical limits, removing the uppermost ring of said mandrel and reattaching said uppermost ring to the lower edge portion of the lowermost ring with the reattached ring being disposed in alignment between said fixed vertical limits, winding the succeeding portion of the mandrel and the lower edge portion of said section with said strands, and successively repeating the steps of coating said strands with said resin, polymerizing said resin and elevating said mandrel, said operations producing a series of vertically superimposed resin-bonded sections with the upper edge portion of each of said sections overlapping and bonded to the lower edge portion of the preceding section to produce an integral cylindrical structure.

9. A method of fabricating a substantially cylindrical storage structure from long strands of a fibrous material, comprising rotating a vertically disposed substantially cylindrical mandrel about the central axis thereof, winding a strand of fibrous material on a portion of said rotating mandrel in a generally helical pattern, applying an unpolymerized liquid resin to the strands, polymerizing the resin to form a resin-bonded cylindrical section, aligning a second lower portion of the mandrel between the fixed limits of the winding head, and then successively repeating the steps of rotating the mandrel, reciprocating the winding head, applying resin to the strands and polymerizing the resin to form a second resin-bonded cylindrical section disposed in lapping integral relation with the lower edge portion of said first section.

10. A method of fabricating a substantially cylindrical storage structure from long strands of a fibrous material, comprising attaching the free end of a long coiled strand of fibrous material to a substantially cylindrical vertically disposed mandrel mounted on a base, rotating the mandrel about its central axis on the base while reciprocating the coiled strand between fixed vertical limits to wind the strand on the mandrel in a double helical pattern, coating the strand with an uncured resin, curing the resin to form a resin-bonded cylindrical section, raising the cylindrical section and the mandrel from the base, attaching a second mandrel to the lowermost edge portion of the first mandrel, lowering the section and the mandrels to dispose said second mandrel on the base with the second mandrel being aligned between the fixed limits of reciprocation of the coiled strand, and then repeating the steps of rotating the mandrel while reciprocating the coiled strand and coating the strand and curing the resin to form a second resin-bonded cylindrical section disposed in lapping integral relation with the lower edge portion of the first section.

11. A method of fabricating a substantially cylindrical storage structure from long strands of a fibrous material, comprising attaching the free end of a long coiled strand of fibrous material to a substantially cylindrical vertically disposed mandrel mounted on a base, said mandrel being formed of a series of vertically superimposed cylindrical segments, rotating the mandrel about its central axis on the base while reciprocating the coiled strand between fixed vertical limits to wind the strand on the mandrel in a double helical pattern, coating the strand with an uncured resin, curing the resin to form a resin-bonded cylindrical section, raising the cylindrical section and the mandrel from the base, disengaging the uppermost segment of the mandrel and reattaching said uppermost segment to the lower edge portion of the lowermost segment, lowering said resin-bonded section and the mandrel to dispose the reattached segment on the base with the reattached segment being aligned between the fixed limits of reciprocation of the coiled strand, and then repeating the steps of rotating the mandrel while reciprocating the coiled strand, coating the strand and curing the resin to form a second resin-bonded cylindrical section disposed in lapping integral relation with the lower edge portion of the first section.

References Cited in the file of this patent

UNITED STATES PATENTS

| Number | Name | Date |
|---|---|---|
| 140,934 | Mayall | July 15, 1873 |
| 1,028,067 | Bolton | May 28, 1912 |
| 2,057,789 | Petersen | Oct. 20, 1936 |
| 2,277,602 | Novak | Mar. 24, 1942 |
| 2,605,540 | Kroll et al. | Aug. 5, 1952 |
| 2,614,058 | Francis | Oct. 14, 1952 |
| 2,615,491 | Harris et al. | Oct. 28, 1952 |
| 2,629,894 | Boggs | Mar. 3, 1953 |
| 2,656,873 | Stephen | Oct. 27, 1953 |
| 2,664,375 | Slayter | Dec. 29, 1953 |

UNITED STATES PATENT OFFICE

CERTIFICATE OF CORRECTION

Patent No. 2,808,097                                                        October 1, 1957

Wesley G. Martin

It is hereby certified that error appears in the printed specification of the above numbered patent requiring correction and that the said Letters Patent should read as corrected below.

Column 9, lines 12 and 13, strike out "and the lower edge portion of said cylindrical part" and insert the same after "section" in line 13, same column.

Signed and sealed this 19th day of November 1957.

(SEAL)
Attest:

KARL H. AXLINE
Attesting Officer

ROBERT C. WATSON
Commissioner of Patents